(12) United States Patent
Chiba et al.

(10) Patent No.: US 11,427,369 B2
(45) Date of Patent: Aug. 30, 2022

(54) DELAMINATION CONTAINER

(71) Applicant: YOSHINO KOGYOSHO CO., LTD., Tokyo (JP)

(72) Inventors: Junichi Chiba, Tokyo (JP); Koji Sugane, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 118 days.

(21) Appl. No.: 16/960,624

(22) PCT Filed: Nov. 13, 2018

(86) PCT No.: PCT/JP2018/042036
§ 371 (c)(1),
(2) Date: Jul. 8, 2020

(87) PCT Pub. No.: WO2019/150702
PCT Pub. Date: Aug. 8, 2019

(65) Prior Publication Data
US 2020/0361651 A1  Nov. 19, 2020

(30) Foreign Application Priority Data
Jan. 30, 2018 (JP) .............................. JP2018-013750

(51) Int. Cl.
*B65D 1/02* (2006.01)
*B29C 49/06* (2006.01)
(Continued)

(52) U.S. Cl.
CPC ............ *B65D 1/0215* (2013.01); *B29C 49/06* (2013.01); *B65D 1/0246* (2013.01); *B65D 23/00* (2013.01);
(Continued)

(58) Field of Classification Search
CPC .... B65D 1/0246; B65D 1/023; B65D 1/0215; B65D 1/0207; B65D 1/40; B65D 23/02;
(Continued)

(56) References Cited

U.S. PATENT DOCUMENTS 5,894,041 A * 4/1999 Cornell ............... B32B 38/0008
428/161
9,849,621 B2 12/2017 Van Hove et al.
(Continued)

FOREIGN PATENT DOCUMENTS

EP       2508318 A1   10/2012
JP       S63-49371 U  4/1988
(Continued)

OTHER PUBLICATIONS

Aug. 4, 2020 International Preliminary Report on Patentability issued in International Patent Application No. PCT/JP2018/042036.
(Continued)

*Primary Examiner* — Robert J Hicks
(74) *Attorney, Agent, or Firm* — Oliff PLC

(57) ABSTRACT

A synthetic resin delamination container formed by blow molding a preform assembly having an outer preform and an inner preform, at least either one of an inner surface of the outer preform and an outer surface of the inner preform being applied with a release agent. The delamination container has: an outer layer body including an outer mouth portion and a bottomed tubular body portion being continuous with the outer mouth portion; an inner layer body including an inner mouth portion and a volume-reducible and deformable storage portion peelably laminated on an inner surface of the body portion through a release agent layer formed by the release agent; and an outside air introduction port configured to introduce outside air between the outer layer body and the inner layer body, in which an
(Continued)

applying amount per unit area of the release agent layer is 10 to 850 mg/m².

8 Claims, 6 Drawing Sheets

(51) Int. Cl.
    *B65D 23/00*     (2006.01)
    *B29K 67/00*     (2006.01)
    *B29L 31/00*     (2006.01)

(52) U.S. Cl.
    CPC ............ *B29C 2949/079* (2022.05); *B29C 2949/3032* (2022.05); *B29C 2949/3034* (2022.05); *B29C 2949/3086* (2022.05); *B29K 2067/003* (2013.01); *B29L 2031/7158* (2013.01)

(58) Field of Classification Search
    CPC ........ B65D 23/00; B65D 25/14; B29C 49/06; B29C 49/221; B29C 49/22
    USPC ........... 215/12.2, 12.1, 44; 220/62.12, 62.22, 220/62.21; 428/36.91, 36.9, 35.7
    See application file for complete search history.

(56) References Cited

U.S. PATENT DOCUMENTS

| | | | |
|---|---|---|---|
| 2015/0266230 A1* | 9/2015 | Van Hove | B29C 49/48 264/513 |
| 2021/0086430 A1* | 3/2021 | Miyawaki | B29C 49/24 |
| 2021/0114280 A1* | 4/2021 | Van Hove | B29C 49/22 |

FOREIGN PATENT DOCUMENTS

| | | |
|---|---|---|
| JP | H08-080929 A | 3/1996 |
| JP | 2001-114328 A | 4/2001 |
| JP | 2005-088200 A | 4/2005 |
| JP | 5168572 B2 | 3/2013 |
| JP | 2015-224070 A | 12/2015 |
| JP | 2016-101672 A | 6/2016 |
| JP | 2017-186059 A | 10/2017 |

OTHER PUBLICATIONS

Jan. 29, 2019 International Search Report issued in International Patent Application No. PCT/JP2018/042036.

Sep. 7, 2021 Office Action issued in Japanese Patent Application No. 2018-013750.

Sep. 23, 2021 Search Report issued in European Patent Application No. 18903566.0.

Dec. 14, 2021 Notification for Written Submission of Publications issued in Japanese Patent Application No. 2018-013750.

Dec. 15, 2021 Office Action issued in Chinese Patent Application No. 201880085974.0.

Apr. 5, 2022 Office Action issued in Japanese Patent Application No. 2018-013750.

May 13, 2022 Office Action issued in Chinese Patent Application No. 201880085974.0.

* cited by examiner

DELAMINATION CONTAINER

TECHNICAL FIELD

The present disclosure relates to a synthetic resin delamination container formed by blow molding a preform assembly in which an inner preform is incorporated inside an outer preform.

BACKGROUND

As a container that contains food seasonings such as soy source, beverages, cosmetics, shampoo, rinse, liquid soap and the like as a content liquid, a synthetic resin delamination container (laminated peeling container) is known. The delamination container is formed in a double structure by blow molding a preform assembly in which an inner preform is incorporated inside an outer preform. The delamination container has: an outer layer body including a tubular outer mouth portion and a bottomed tubular body portion being continuous with the outer mouth portion; and an inner layer body including a tubular inner mouth portion disposed inside the outer mouth portion and a volume-reducible and deformable storage portion peelably laminated on an inner surface of the body portion.

Such a delamination container is used, for example, as a squeeze type dispensing container combined with a spout cap having a check vale or a container with a pump combined with a pump, and can dispense a content liquid to the outside by squeezing a body portion of the outer layer body or by operating a pump. On the other hand, after a content liquid is dispensed, only a storage portion of the inner layer body can be reduced in volume and deformed while the outer layer body is restored to its original shape or is maintained by introducing the outside air between the inner layer body and the outer layer body from an outside air introduction port provided at the outer layer body. Therefore, with a delamination container, a content liquid contained in the storage portion of the inner layer body is dispensed to the outside without being replaced with the outside air. Thus contact of the outside air with a content liquid contained in the inner layer body is reduced, and deterioration and change in quality of the content liquid can be suppressed.

However, since an existing delamination container is formed by blow molding a preform assembly in which an inner preform is incorporated inside an outer preform, an outer surface of the storage portion of the inner layer body strongly adheres to an inner surface of the body portion of the outer layer body due to high pressure and heat during the blow molding. As a result, a peeling resistance of the storage portion with respect to the body portion increases, and there is a problem that it is possible that the storage portion may cause insufficient peeling when a content liquid is dispensed. In particular, when the body portion is formed in a bottle shape having a shoulder portion, a main body portion and a bottom portion and the outside air introduction port is formed as a through hole passing through the outer mouth portion of the outer layer body in the radial direction, the storage portion is hard to be peeled off at the shoulder portion, and the outside air introduced from the outside air introduction port is not supplied to the main body portion. As a result, a function as a delamination container may not be exhibited.

Further, when both the outer layer body and the inner layer body are each made of polyethylene terephthalate resin, the peeling resistance of the storage portion with respect to the body portion further increases. Therefore, in addition to the above described problem, when the body portion is squeezed as a content liquid is dispensed, the outside surface of the storage portion rubs against the inner surface of the body portion and creaks, which causes a problem of unusual sense of touch of the body portion.

In order to address the above described problems, for example, Patent Literature 1 (PTL 1) discloses a delamination container, in which heat-resistant silicone oil is previously applied to at least either one of the inner surface of the outer preform and the outer surface of the inner preform to provide a release agent layer formed of heat-resistant silicone oil between the inner surface of the body portion and the outer surface of the storage portion. In this manner the peeling resistance of the storage portion with respect to the body portion is reduced.

CITATION LIST

Patent Literature

PTL 1: JP5168572 (B2)

SUMMARY

Technical Problem

However, as the delamination container disclosed in PTL 1, when a preform assembly in which heat-resistant silicone oil is previously applied to at least either one of the inner surface of the outer preform and the outer surface of the inner preform is blow molded, moldability of a container in blow molding is decreased depending on the applying amount of the release agent. Thus, a delamination container of a desired shape may not be obtained, or creaks generated between the storage portion and the body portion may not be sufficiently reduced.

The present disclosure has been made in view of the above described problems, and it is an object of the present disclosure to provide a delamination container that has a storage portion peeled off easily from the body portion and can be precisely molded into a predetermined shape.

Solution to Problem

A disclosed delamination container is a synthetic resin delamination container formed by blow molding a preform assembly having an outer preform and an inner preform incorporated inside the outer preform, at least either one of an inner surface of the outer preform and an outer surface of the inner preform being applied with a release agent. The delamination container has: an outer layer body including a tubular outer mouth portion and a bottomed tubular body portion being continuous with the outer mouth portion; an inner layer body including a tubular inner mouth portion disposed inside the outer mouth portion and a volume-reducible and deformable storage portion peelably laminated on an inner surface of the body portion through a release agent layer formed by the release agent; and an outside air introduction port configured to introduce outside air between the outer layer body and the inner layer body, wherein an applying amount per unit area of the release agent layer is 10 to 850 mg/m$^2$.

In the delamination container configured in the above described manner, preferably, the outside air introduction port is a through hole passing through the outer mouth portion in the radial direction.

In the delamination container configured in the above described manner, preferably, the body portion has a shoulder portion being continuous with a lower end of the outer mouth portion, a tubular main body portion being continuous with a lower end of the shoulder portion and a bottom portion configured to close a lower end of the main body portion, in which the release agent layer is provided in an area corresponding to the shoulder portion and the main body portion, and is not provided in an area corresponding to the bottom portion.

In the delamination container configured in the above described manner, the outer layer body and the inner layer body are each made of polyethylene terephthalate resin.

Advantageous Effect

According to the present disclosure, a delamination container that has a storage portion peeled off easily from a body portion and can be precisely molded into a predetermined shape can be provided.

BRIEF DESCRIPTION OF THE DRAWINGS

In the accompanying drawings:

FIG. 2 is a plan view of the delamination container illustrated in

FIG. 1;

DETAILED DESCRIPTION

The present disclosure will be illustrated in more detail below with reference to the drawings.

Figure 1:
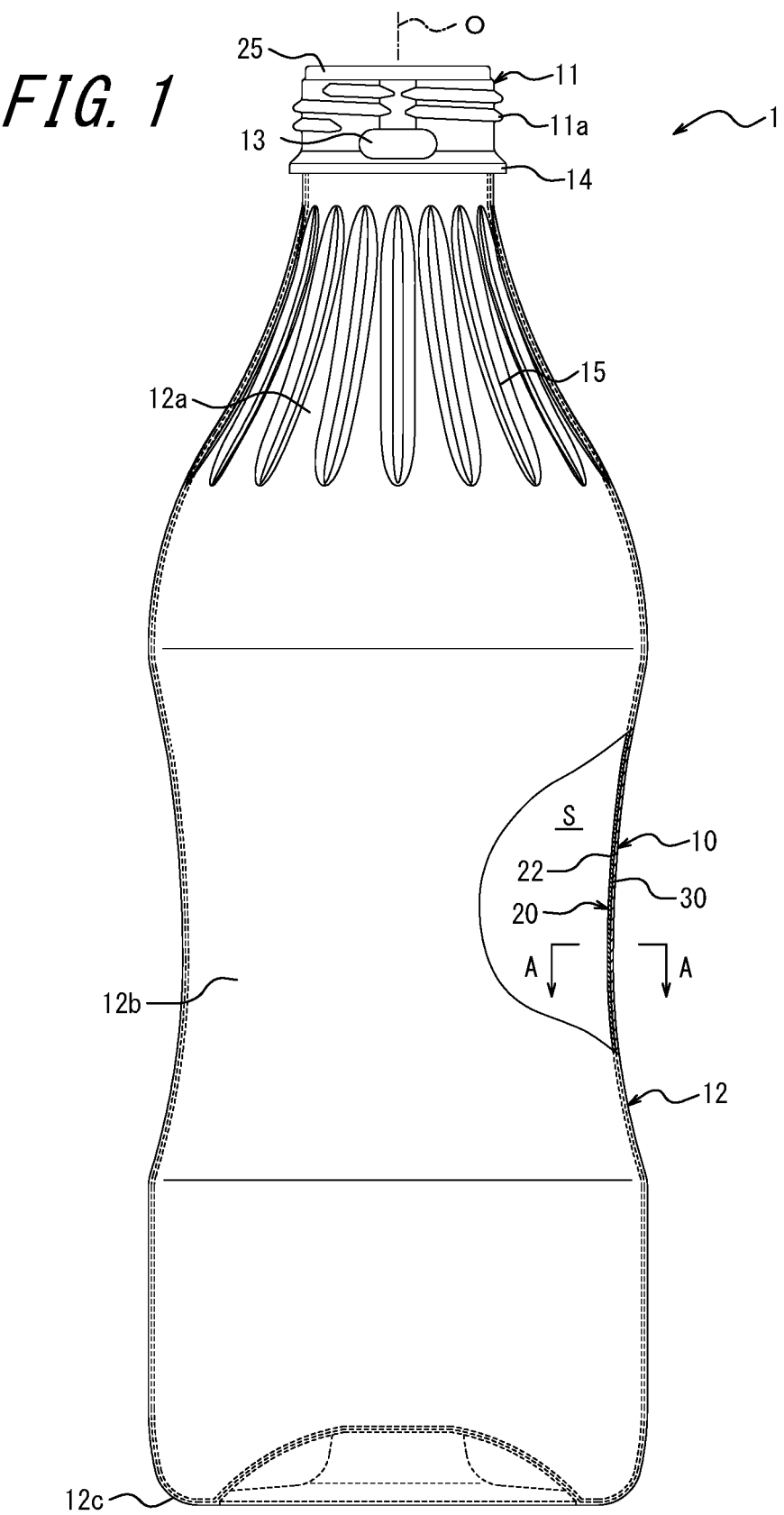
FIG. 1 is a side view of a delamination container according to an embodiment of the present disclosure illustrating a part thereof cut away.

A delamination container 1 according to an embodiment of the present disclosure illustrated in FIG. 1 is made of synthetic resin, and has a double structure including an outer layer body 10 and an inner layer body 20. Hereinafter the delamination container 1 is described as a squeeze type dispensing container that contains food seasoning such as soy source as a content liquid.

It is to be noted that, in this specification, the scope of claims and drawings, the up-down direction is an up-down direction in a state where the delamination container 1 is put in the upright posture as illustrated in FIG. 1, and the radial direction means the direction passing through the axis center O of the delamination container 1 and being along a line vertical to the axis center O.

The outer layer body 10 forms an outer shell of the delamination container 1, and is formed in a bottle shape including an outer mouth portion 11 and a bottomed tubular body portion 12 being integrally continuous with the lower end of the outer mouth portion 11.

Figure 2:
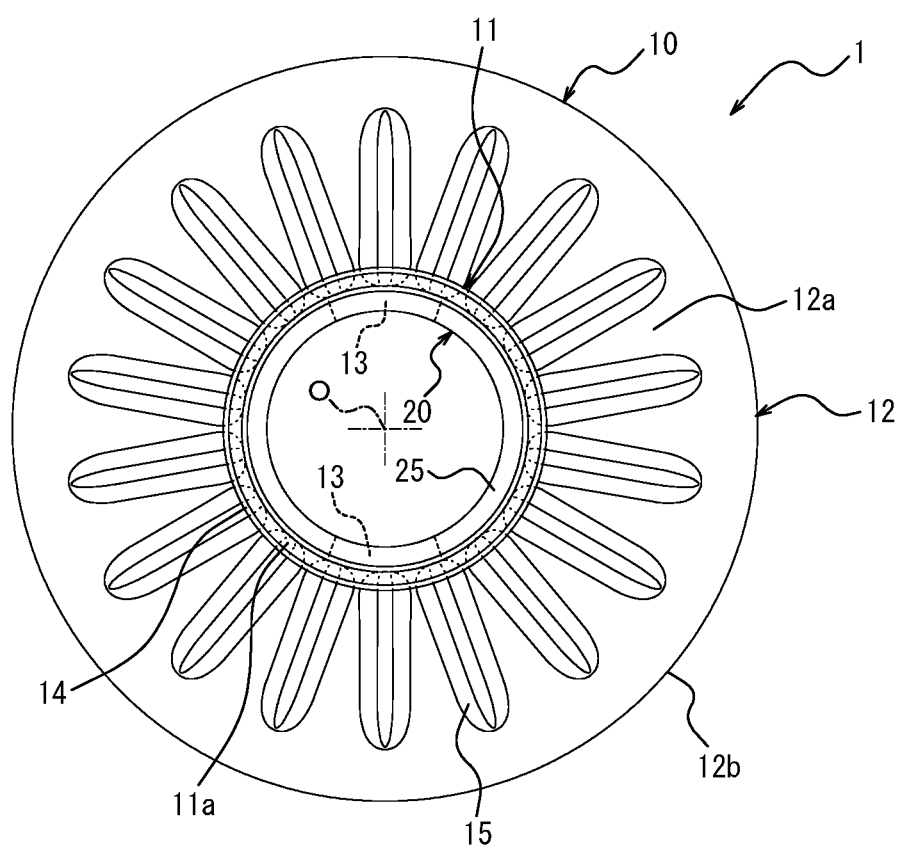

As illustrated in FIGS. 1 and 2, the outer mouth portion 11 has a cylindrical shape, and an outer peripheral surface thereof is integrally provided with a male thread 11a. A spout cap (not illustrated) that is screw connected to the male thread 11a and has a spout outlet can be attached to the outer mouth portion 11.

It is to be noted that the outer mouth portion 11 may include, instead of the male thread 11a, an annular protrusion and may be configured such that a spout cap is engaged with the protrusion by plugging in an undercut manner. In this case, the shape of the outer mouth portion 11 is not limited to a tubular shape, and may be rectangular tube or elliptic tube shape as long as it is tubular.

A pair of outside air introduction ports 13 are provided to the outer mouth portion 11. The pair of outside air introduction ports 13 are long-hole shaped through holes each passing through the outer mouth portion 11 in the radial direction and extending in the circumferential direction, and are disposed symmetrical to each other on both sides across the axis center O of the outer mouth portion 11. Each of the pair of outside air introduction ports 13 is communicated with between the outer layer body 10 and the inner layer body 20, and outside air can be introduced between the outer layer body 10 and the inner layer body 20 through these outside air introduction ports 13.

Under the outside air introduction port 13 of the outer mouth portion 11 is integrally provided with a neck ring 14. The neck ring 14 annularly extends over the entire circumference of the outer mouth portion 11, and projects radially outward from the outer peripheral surface of the outer mouth portion 11.

The body portion 12 has a shoulder portion 12a, a main body portion 12b and a bottom portion 12c.

The shoulder portion 12a is integrally continuous with the lower end of the outer mouth portion 11, has a diameter gradually increasing downward, and radially projects outward with respect to the outer mouth portion 11. The main body portion 12b is formed in a tubular shape with a substantially circular cross section having a narrow portion, and the upper end thereof is integrally continuous with the lower end of the shoulder portion 12a. The bottom portion 12c is integrally continuous with the lower end of the main body portion 12b and closes the lower end of the main body portion 12b. The bottom portion 12c has a shape in which the inside of an annular outer peripheral edge is recessed, and when the bottom portion 12c is grounded, the delamination container 1 can be disposed in an upright posture.

The main body portion 12b is flexible, and when squeezed, it is elastically deformed, can be recessed radially inward and elastically restored to its original shape by itself from the recessed state. Since the main body portion 12b is configured to be elastically deformable when squeezed, in the case where the delamination container 1 is used as a squeeze type dispensing container, operation of dispensing a content liquid can be easily performed and the main body portion 12b can be easily restored to its original shape after the content liquid is dispensed, which allows the outside air to be reliably introduced between the outer layer body 10 and the inner layer body 20 through the outside air introduction port 13. In this manner, functions as the delamination container 1 can be reliably exhibited.

The shoulder portion 12a is provided with a plurality (18 pieces) of recessed ribs 15 extending in the up-down direction arranged at equal intervals over the entire circumference in the circumferential direction. It is to be noted that, for convenience, only one recessed rib 15 is assigned with a reference sign in FIGS. 1 and 2. When a plurality of recessed ribs 15 are provided to the shoulder portion 12a, the inner layer body 20 can be easily peeled off from the outer layer body 10 at the shoulder portion 12a. It is to be noted that the recessed ribs 15 may not be provided.

The inner layer body 20 has an inner mouth portion 21 and a storage portion 22.

Figure 3:
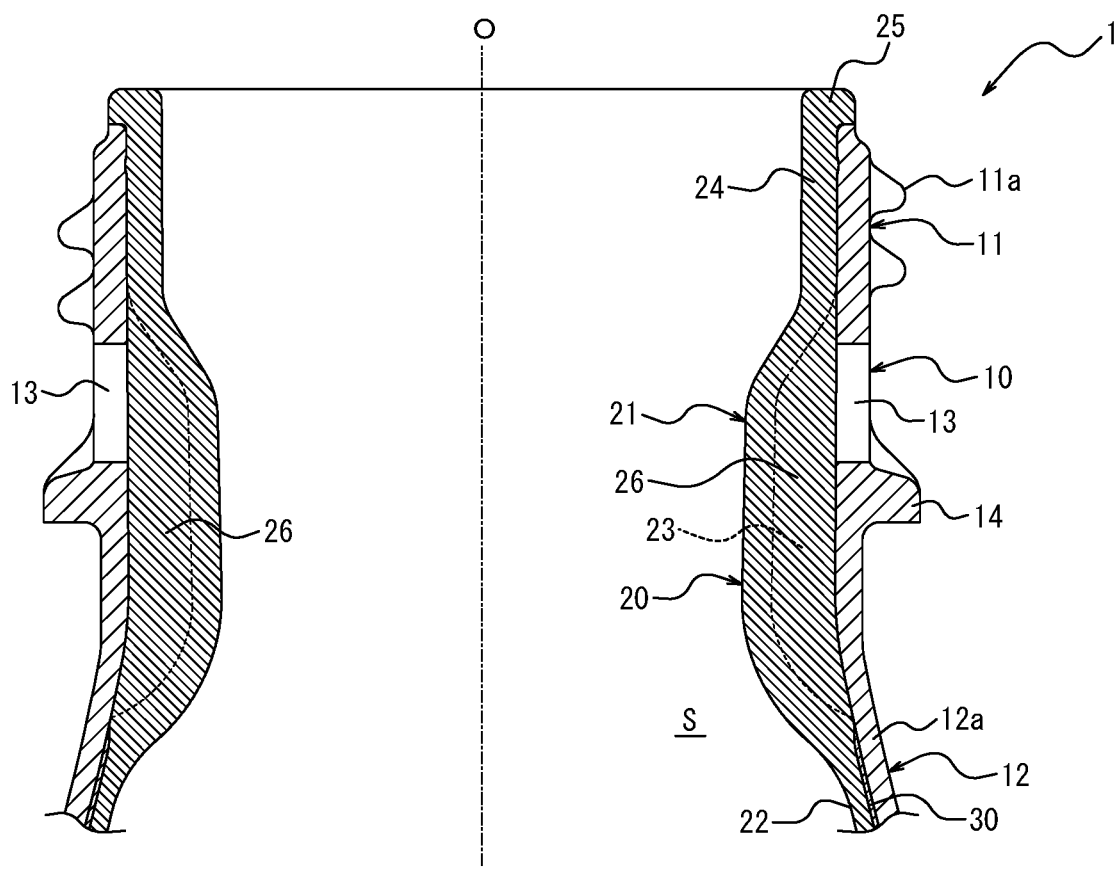
FIG. 3 is a cross-sectional view of an outer mouth portion and an inner mouth portion of the delamination container illustrated in FIG. 1.

As illustrated in FIG. 3, the inner mouth portion 21 has a tubular shape whose diameter is smaller than that of the outer mouth portion 11, and is disposed inside the outer mouth portion 11 being coaxially therewith. A gap 23 having a predetermined space is provided between the inner peripheral surface of the outer mouth portion 11 and the outer peripheral surface of the inner mouth portion 21. An enlarged diameter portion 24 is provided at the upper end of the inner mouth portion 21 in an integrally continuous manner. When the outer peripheral surface of the enlarged diameter portion 24 is brought in contact with the inner peripheral surface of the outer mouth portion 11 over its circumference, the gap 23 between the outer mouth portion 11 and the inner mouth portion 21 is closed with respect to the outside at the upper end portion of the outer mouth portion 11 or the inner mouth portion 21. On the upper end of the enlarged diameter portion 24 is integrally provided with a flange portion 25 extending radially outward, and when the flange portion 25 is brought in contact with the upper end of the outer mouth portion 11, the inner mouth portion 21 is positioned with respect to the outer mouth portion 11 in the axial direction.

The shape of the inner mouth portion 21 is not limited to a cylindrical shape, and may be a tubular shape. For example, when the outer mouth portion 11 is formed in a rectangular tube shape or an elliptic tube shape, the inner mouth portion 21 may also be formed in a rectangular tube shape or an elliptic tube shape.

As illustrated in FIG. 1, the storage portion 22 is formed in a bag shape with a thickness smaller than that of the body portion 12, is integrally continuous with the lower end of the inner mouth portion 21 and is peelably laminated on the inner surface of the body portion 12 through a release agent layer 30. The release agent layer 30 will be described later. Inside the storage portion 22 is a storage space S for a content liquid. A content liquid can be filled into the storage portion 22 through the inner mouth portion 21, and a content liquid contained in the storage portion 22 can be dispensed to the outside through the inner mouth portion 21. As a content liquid is dispensed, the storage portion 22 can be reduced in volume and deformed (deformed so as to reduce the internal volume) while peeled off from the inner surface of the body portion 12. When the outside air is introduced between the outer layer body 10 and the inner layer body 20 from the outside air introduction port 13 accompanied with volume reduction and deformation of the storage portion 22, only the storage portion 22 is easily peeled off from the inner surface of the body portion 12 and can be reduced in volume and deformed while the main body portion 12b is maintained in or restored to its original shape.

As illustrated in FIG. 3, in order to secure an outside air passage from the outside air introduction port 13 toward between the body portion 12 and the storage portion 22, the outer surface of the inner layer body 20 is integrally provided with longitudinal ribs 26. Although not illustrated in detail, in the delamination container 1 according to this embodiment, on the outer surface of the inner layer body 20, three longitudinal ribs 26 are provided side by side at intervals in the circumferential direction in a predetermined range in the circumferential direction centering on one of the outside air introduction ports 13, and three longitudinal ribs 26 are provided side by side at intervals in the circumferential direction in a predetermined range in the circumferential direction centering on the other outside air introduction port 13. At least one of these longitudinal ribs 26 faces each outside air introduction port 13. Each longitudinal rib 26 projects radially outward from the outer surface of the inner layer body 20 and extends in the direction along the axis center O from the inner mouth portion 21 to the storage portion 22, and forms an outside air ventilation path between the outer layer body 10 and the inner layer body 20, the path extending from the outside air introduction port 13 to a portion between the shoulder portion 12a and the storage portion 22 over the neck ring 14. In this manner, the outside air ventilation path introduced from the outside air introduction port 13 can be reliably introduced to between the shoulder portion 12a and the storage portion 22.

It is to be noted that the longitudinal ribs 26 may be provided on the inner peripheral surface of the outer mouth portion 11. Furthermore, no longitudinal rib 26 may be provided to either the outer mouth portion 11 or the inner mouth portion 21.

Both the outer layer body 10 and the inner layer body 20 are made of polyethylene terephthalate resin (PET). When the outer layer body 10 and the inner layer body 20 are each made of polyethylene terephthalate resin, the delamination container 1 can be lightweight and highly transparent.

Figure 4:
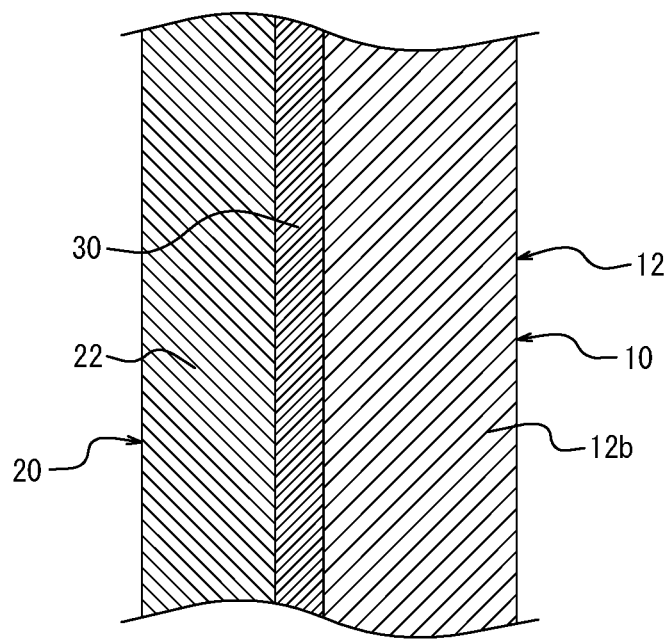
FIG. 4 is a cross-sectional view taking along the line A-A in FIG. 1.

As described above, the storage portion 22 of the inner layer body 20 is peelably laminated on the inner surface of the body portion 12 through the release agent layer 30. That is, as illustrated in FIG. 4, the release agent layer 30 is provided between the storage portion 22 and the body portion 12. When the release agent layer 30 is provided between the storage portion 22 and the body portion 12, the peeling resistance of the storage portion 22 with respect to the body portion 12 can be reduced to such an extent that the storage portion 22 does not cause a peeling failure.

The release agent layer 30 is formed of release agent. That is, the release agent is applied to both the outer surface of the storage portion 22 and the inner surface of the body portion 12. In this manner, the release agent layer 30 is formed between the storage portion 22 and the body portion 12.

Here, the release agent means an agent applied between the storage portion 22 and the body portion 12 and can reduce the peeling resistance of the storage portion 22 with respect to the body portion 12. As such a release agent, silicone oil can be adopted, for example. In this embodiment, the release agent forming the release agent layer 30 is silicone oil "ELEMENT 14*PDMS 350-J" from Momentive Performance Materials Co., Ltd. It is to be noted that the release agent forming the release agent layer 30 is not limited to the above described silicone oil, and may be other silicone oil or a release agent other than silicone oil.

In this embodiment, the release agent layer 30 is provided to an area corresponding to the shoulder portion 12a and the main body portion 12b. More specifically, as illustrated in FIG. 3, the release agent layer 30 is provided to an area that is the downside of the lower end of the longitudinal rib 26 of the shoulder portion 12a and to an entire area of the main body portion 12b not illustrated in detail. On the other hand, the release agent layer 30 is not provided to an area corresponding to the bottom portion 12c of between the storage portion 22 and the body portion 12.

It is to be noted that the release agent layer 30 may be provided to all area between the storage portion 22 and the body portion 12, or may extend to a portion between the outer mouth portion 11 and the inner mouth portion 21.

Here, in the delamination container 1 according to this embodiment, an applying amount per unit area of the release agent layer 30 is 10 to 850 mg/m$^2$. That is, although the release agent layer 30 is provided by applying the release agent to an inner surface of the body portion 12 or an outer surface of the storage portion 22 in a predetermined area between the storage portion 22 and the body portion 12, in that area, the weight of the release agent applied to the inner surface of the body portion 12 or the outer surface of the storage portion 22 per unit area (1 m$^2$) of the inner surface of the body portion 12 or the outer surface of the storage portion 22 is in a range of 10 to 850 mg. It is to be noted that, preferably, although the release agent layer 30 has a uniform thickness over the entire portion of a predetermined area between the storage portion 22 and the body portion 12, as long as the above described numerical range is satisfied, the release agent layer 30 may include a portion where the thickness is not uniform or portions with thicknesses different from each other.

Figure 5:
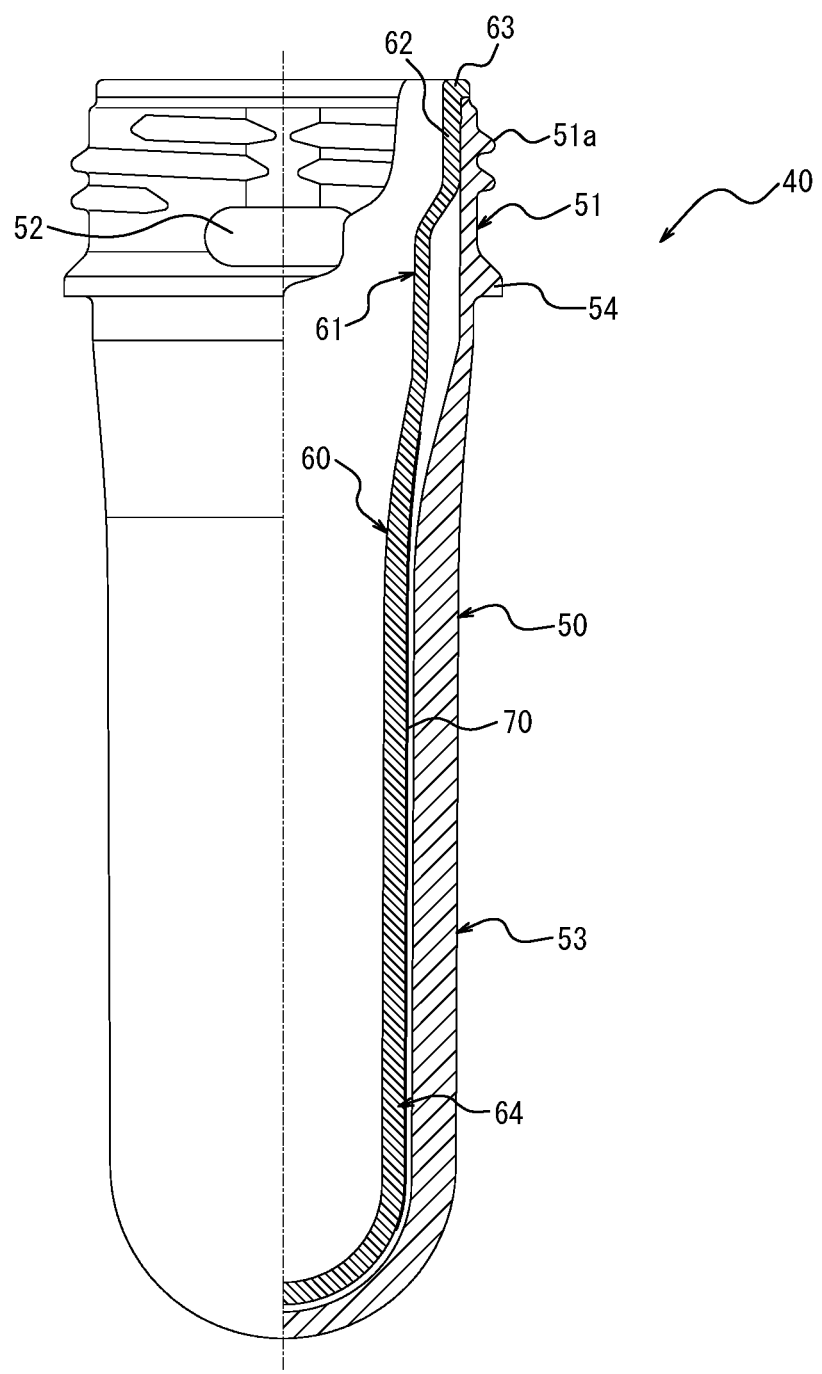
FIG. 5 is a side view of a preform assembly for forming the delamination container in FIG. 1, illustrating a part thereof cut away.

The delamination container 1 configured in the above described manner can be formed by blow molding a synthetic resin preform assembly 40 illustrated in FIG. 5. The preform assembly 40 has a double structure in which a synthetic resin inner preform 60 configured to form the inner layer body 20 is incorporated inside a synthetic resin outer preform 50 configured to form the outer layer body 10.

The outer preform 50 is formed, by using a mold, in a predetermined shape corresponding to the outer layer body 10 by injection molding a synthetic resin material, which is the same as that used for the outer layer body 10. In this embodiment, as with the outer layer body 10, the outer preform 50 is made of polyethylene terephthalate resin.

The outer preform 50 has an outer mouth portion 51 having the same shape as that of the outer mouth portion 11 of the outer layer body 10. That is, the outer mouth portion 51 has a cylindrical shape, the outer peripheral surface thereof is integrally provided with a male thread 51a, and a pair of outside air introduction ports 52 each passing through the outer mouth portion 51 in the radial direction are provided symmetrical to each other on both sides across the axis center of the outer mouth portion 51. Further, the lower end of the outer mouth portion 51 is integrally provided with a stretch portion 53 of a substantial test tube shape having a semispherical bottom portion. The stretch portion 53 is thicker than the outer mouth portion 51. A neck ring 54 having a flange shape is integrally provided between the outer mouth portion 51 and the stretch portion 53.

The inner preform 60 is formed, by using a mold, in a predetermined shape corresponding to the inner layer body 20 by injection molding a synthetic resin material, which is the same material used for the inner layer body 20. In this embodiment, as with the inner layer body 20, the inner preform 60 is made of polyethylene terephthalate resin.

Figure 6:
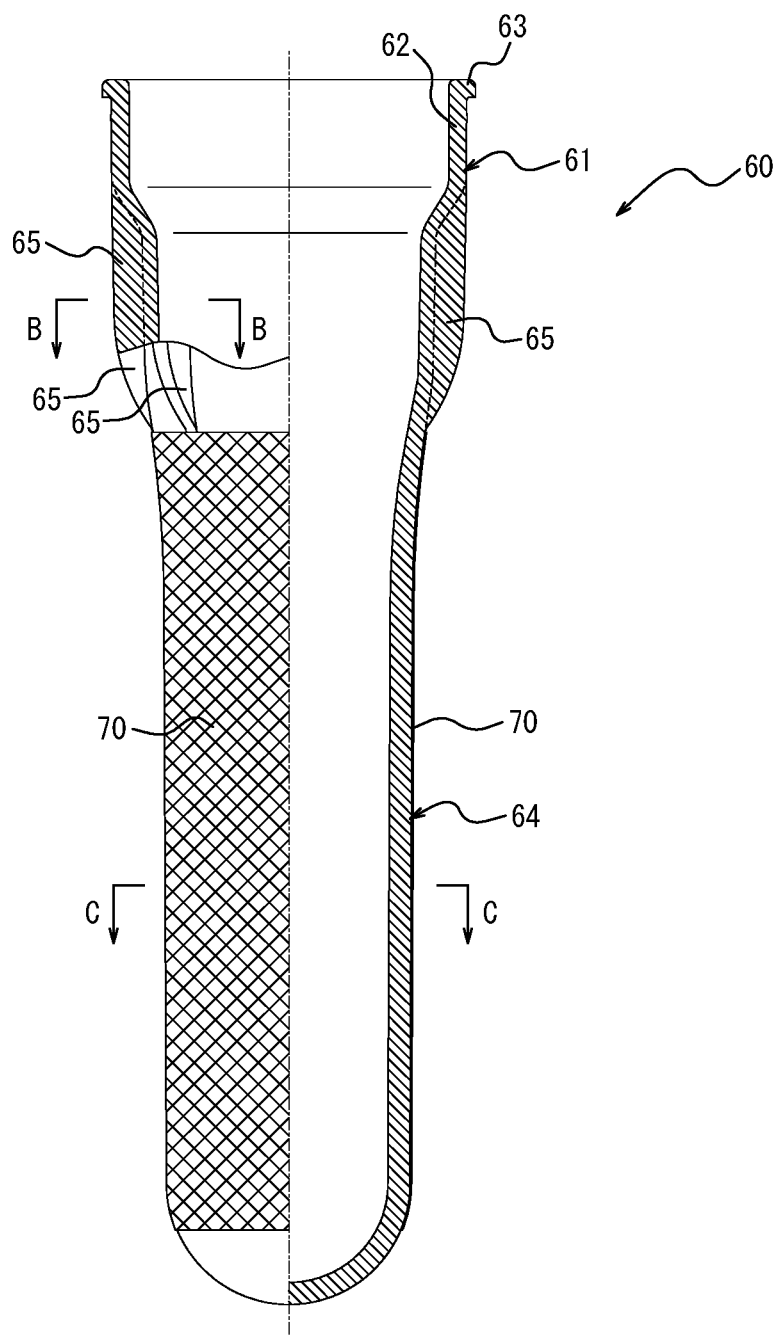
FIG. 6 is a side view of an inner preform in FIG. 5, illustrating a part thereof cut away.

As illustrated in FIGS. 5 and 6, the inner preform 60 has an inner mouth portion 61 which has the same shape as that of the inner mouth portion 21 of the inner layer body 20. That is, the inner mouth portion 61 has a cylindrical shape whose diameter is smaller than that of the outer mouth portion 51, and is disposed inside the outer mouth portion 51 coaxially with the outer mouth portion 51. An enlarged diameter portion 62 is integrally provided to the upper end of the inner mouth portion 61, and when an outer peripheral surface of the enlarged diameter portion 62 is brought in contact with an entire circumference of an inner peripheral surface of the outer mouth portion 51, the upper end portion of a gap between the outer mouth portion 51 and the inner mouth portion 61 is closed with respect to the outside. A flange portion 63 extending radially outward is integrally provided to the upper end of the enlarged diameter portion 62, and when the flange portion 63 is brought in contact with the upper end of the outer mouth portion 51, the inner mouth portion 61 is axially positioned with respect to the outer mouth portion 51. A substantially test tube shaped stretch portion 64 having a semispherical bottom portion is integrally provided to the lower end of the inner mouth portion 61. The outer diameter of the stretch portion 64 is smaller than that of the inner mouth portion 61. A gap is provided between the outer peripheral surface of the stretch portion 64 and the inner peripheral surface of the stretch portion 53, and when the inner preform 60 is incorporated into the outer preform 50, the outer peripheral surface of the stretch portion 64 and the inner peripheral surface of the stretch portion 53 are not scratched. On the outer surface of the inner preform 60, three longitudinal ribs 65 are provided side by side at intervals in the circumferential direction in a predetermined range in the circumferential direction centering on one of the outside air introduction ports 52, and three longitudinal ribs 65 are provided side by side at intervals in the circumferential direction in a predetermined range in the circumferential direction centering on the other outside air introduction port 52. The shape of each longitudinal rib 65 is the same as that of the longitudinal rib 26 provided on the outer peripheral surface of the inner mouth portion 21.

A release agent 70 is applied to the outer surface of the inner preform 60. The release agent 70 forms the release agent layer 30 when the preform assembly 40 is blow molded into a delamination container 1. That is, in this embodiment, the release agent 70 is silicone oil "ELEMENT 14*PDMS 350-J" from Momentive Performance Materials Co., Ltd. It is to be noted that the release agent is not limited to the above described silicone oil, and may be other silicone oil or a release agent other than silicone oil.

The release agent 70 is applied to the downside of the longitudinal rib 65 on the outer surface of the stretch portion 64 of the inner preform 60, and is not applied to the lower end portion of the stretch portion 64 of the inner preform 60 (a semispherical portion corresponding to the bottom portion 12c). It is to be noted that, when the release agent layer 30 is provided to all areas between the inner surface of the body portion 12 and the outer surface of the storage portion 22 of the delamination container 1 after molding, the release agent 70 is applied to the entire area below the longitudinal rib 65 of the stretch portion 64 of the inner preform 60.

In this embodiment, the release agent 70 is applied to a predetermined area of the stretch portion 64 of the inner preform 60 by using a roller applicator in a state where the lower end of the stretch portion 64 of the inner preform 60 is treated with masking. It is to be noted that the release agent 70 can be applied to the outer surface of the inner preform 60 with various methods such as, for example, a dipping method in which the stretch portion 64 of the inner preform 60 is immersed into a storage tank that contains the release agent 70, or a spraying method in which the release agent 70 is sprayed to the outer surface of the stretch portion 64 of the inner preform 60 by using a spray equipment.

Here, the amount of the release agent 70 applied to the outer surface of the stretch portion 64 of the inner preform 60 is set so that the applying amount per unit area of the release agent layer 30 is 10 to 850 mg/m$^2$. In this embodiment, the amount of the release agent 70 applied to the outer surface of the stretch portion 64 of the inner preform 60 is 0.4 to 31.4 mg.

The delamination container 1 illustrated in FIG. 1 can be manufactured by blow molding the preform assembly 40 configured in the above described manner. In this embodiment, the biaxial stretch blow molding is adopted as the blow molding.

More specifically, in the biaxial stretching blow molding of the preform assembly 40, the preform assembly 40 is placed in a mold for blow molding constituting a blow molding apparatus (not illustrated) such that the stretch portions 53 and 64 are located inside the cavity with the outer mouth portion 51 and the inner mouth portion 61 projected from the cavity of the mold and with the neck ring 54 being supported on the upper surface of the mold, and in this state, a pressurized medium such as pressurized air or pressurized liquid is supplied into the preform assembly 40 through the inner mouth portion 61 while the stretch portions 53 and 64 are stretched by a stretching rod in the axial direction. In this manner, the stretch portions 53 and 64 are blow molded into a shape conforming to the inner surface of the cavity.

As described above, by the axial stretch blow molding of the preform assembly 40 having an configuration in which the inner preform 60 formed by injection molding is incorporated inside the outer preform 50 formed by injection molding and in which the release agent 70 is applied to an outer surface of the stretch portion 64 of the inner preform 60, a delamination container 1 having the above described configuration in which the release agent layer 30 is provided between the inner surface of the body portion 12 and the outer surface of the storage portion 22 can be manufactured easily at a low cost.

Here, when the amount of the release agent 70 applied to the outer surface of the stretch portion 64 of the inner preform 60 is an amount with which the applying amount per unit area of the release agent layer 30 exceeds 850 mg/m$^2$, the release agent 70 may drip from the outer surface of the stretch portion 64 or the thickness of the applied release agent 70 may become uneven. As a result, handling of the preform assembly 40 may become complicated. Further, uneven thickness of the release agent 70 may cause difficulties in adjusting the thickness of the body portion 12 or the storage portion 22 during blow molding, which will cause voids (minute cavities) or uneven thickness of the body portion 12 or the storage portion 22, or in some cases will cause a burst of a container due to an increase in unevenness of the thickness. As a result a decline in blow moldability will occur.

On the other hand, when the amount of the release agent 70 applied to the outer surface of the stretch portion 64 of the inner preform 60 is an amount with which an applying amount per unit area of the release agent layer 30 is less than 10 mg/m$^2$, it will be difficult to apply the release agent 70 to the outer surface of the stretch portion 64 with a uniform thickness. Further, the release agent layer 30 formed between the inner surface of the body portion 12 and the outer surface of the storage portion 22 becomes thinner, and the peeling resistance of the storage portion 22 with respect to the body portion 12 cannot be sufficiently decreased. Thus, when the body portion 12 is squeezed, the outside surface of the storage portion 22 rubs against the inner surface of the body portion 12 and creaks, which may cause an unusual sense of touch of the body portion 12.

On the contrary, according to the delamination container 1 of this embodiment, since the applying amount per unit area of the release agent layer is 10 to 850 mg/m$^2$, the storage portion 22 can be easily peeled off from the body portion 12 without causing the above described problem. Thus the moldability of the blow molding is enhanced, and the delamination container 1 can be precisely molded into a predetermined shape.

The delamination container 1 according to this embodiment configured in the above described manner can be configured as a squeeze container by attaching a spout cap to the outer mouth portion 11. In this case, as spout caps, for example, those having a check valve for outside air configured to allow the outside air to be introduced into the outside air introduction port 13 and to block the outside air to be flowed to the outside through the outside air introduction port 13 and a check valve for content liquid configured to allow a content liquid to be dispensed to the outside through the inner mouth portion 21 and to block backflow of the outside air into the storage portion 22 may be used.

In the delamination container 1 configured as a squeeze container, when the main body portion 12b of the outer layer body 10 is squeezed, the storage portion 22 is reduced in volume and deformed, and the content liquid is pushed out through the spout cap and dispensed to the outside. When the squeeze of the main body portion 12b is released after the content liquid is dispensed, the main body portion 12b tries to restore to its original shape. However, at that time, when the storage portion 22 of the inner layer body 20 is peeled off from the inner surface of the body portion 12 while the outside air is introduced from the outside air introduction port 13 to between the outer layer body 10 and the inner layer body 20, only the main body portion 12b is restored to its original shape while the storage portion 22 is reduced in volume and deformed. In this manner, the content liquid contained in the storage portion 22 is dispensed without being replaced with the outside air, and contact of the content liquid contained in the storage portion 22 with the outside air is reduced. As a result, deterioration or change in quality of the content liquid can be suppressed.

Here, in the delamination container 1 according to this embodiment, the release agent layer 30 is provided between the inner surface of the body portion 12 and the outer surface of the storage portion 22. Thus, even if both the outer layer body 10 and the inner layer body 20 are made of polyethylene terephthalate resin, the peeling resistance of the storage portion 22 with respect to the body portion 12 can be sufficiently reduced to the extent that the storage portion 22 causes no peeling failure. In this manner, when the content liquid is dispensed, the storage portion 22 is reliably peeled off from body portion 12, and thus a peeling failure of the storage portion 22 can be prevented.

In particular, as with the delamination container 1 according to this embodiment, when the body portion 12 is formed in a bottle shape including the shoulder portion 12a, the main body portion 12b and the bottom portion 12, and the outside air introduction port 13 is configured as a through hole passing through the outer mouth portion 11 of the outer layer body 10 in the radial direction, the storage portion 22 is hard to be peeled off at the shoulder portion 12a, and the outside air introduced from the outside air introduction port 13 is not supplied to the main body portion 12b. As a result, a function as the delamination container 1 may not be exhibited. However, in the delamination container 1 according to this embodiment, the release agent layer 30 is provided between the inner surface of the body portion 12 and the outer surface of the storage portion 22. Thus the storage portion 22 is easily peeled off from the body portion 12 even at the shoulder portion 12a, and the outside air introduced from the outside air introduction port 13 can be reliably supplied to the main body portion 12b.

Further, as described above, since the storage portion 22 can be reliably peeled off from the body portion 12 when the content liquid is dispensed, the body portion 12 squeezed for dispensing the content liquid can be quickly restored to its original shape. Therefore, the delamination container 1 can reliably exhibit its function and can be easier to use.

Furthermore, when the peeling resistance of the storage portion 22 with respect to the body portion 12 is reduced, even if a content liquid is filled in the storage space S of the delamination container 1 without performing an initial peeling work in which the storage portion 22 is previously peeled off from the inner surface of the body portion 12 after the delamination container 1 is formed by blow molding, the storage portion 22 can be reliably peeled off from the inner surface of the body portion when the content liquid is dispensed. In this manner, the initial peeling work after blow molding is no more needed, and manufacturing cost of the delamination container 1 can be reduced.

Moreover, in the delamination container 1 according to this embodiment, the release agent layer 30 is provided only to an area corresponding to the shoulder portion 12a and the main body portion 12b and is not provided to an area corresponding to the bottom portion 12c. Thus, when the body portion 12 is squeezed, an area corresponding to the shoulder portion 12a and the main body portion 12b of the storage portion 22 is peeled off from the inner surface of the body portion 12, but an area corresponding to the bottom portion 12c is not easily peeled off from the inner surface of the body portion 12, then the storage portion 22 is regularly contracted so as to have a flat shape. In this manner, the remaining amount of the content liquid can be reduced.

In order to verify the above described effects obtained by setting the applying amount per unit area of the release agent layer 30 to 10 to 850 mg/m$^2$, nine types of preform assemblies configured as illustrated in FIG. 5 were provided, the amounts of release agent applied to each outer surface of the stretch portion of the inner preform being different from each other. These preform assemblies were biaxial stretch blow molded, and by using each preform assembly, the delamination containers of Examples 1 to 6 and Comparative Examples 1 to 3, each having the above described configuration of the delamination container 1, were manufactured. The applying amounts per unit area of the release agent layers 30 of the delamination containers of Examples 1, 2, 3, 4, 5 and 6 and Comparative Examples 1, 2 and 3 were 10 mg/m$^2$, 24 mg/m$^2$, 37 mg/m$^2$, 300 mg/m$^2$, 600 mg/m$^2$, 850 mg/m$^2$, 1000 mg/m$^2$, 1400 mg/m$^2$, and 3000 mg/m$^2$, respectively.

The amounts of the release agent applied to the outer surface of the stretch portion of the inner preform to manufacture the delamination containers of Examples 1, 2, 3, 4, 5 and 6 and Comparative Examples 1, 2 and 3 were 0.4 mg, 0.9 mg, 1.4 mg, 10.0 mg, 20.0 mg, 31.4 mg, 38.0 mg, 52.0 mg and 100.0 mg, respectively.

With respect to the delamination containers of Examples 1 to 6 and Comparative Examples 1 to 3, the handleability (ease of handling) of the preform assembly, blow moldability and a sense of touch of the body portion of the delamination container after molding, in the manufacturing process, were evaluated. In the evaluation, in terms of the handleability of the preform assembly, when the release agent applied to the outer surface of the stretch portion of the inner preform dripped or caused uneven thickness, it was evaluated as poor, and when the above described problem did not occur, it was evaluated as good. Further, in terms of the blow moldability, when the delamination container after molding was not formed in a predetermined shape or had molding failure such as voids, uneven thickness or burst, it was evaluated as poor, and when the above described problems did not occur, it was evaluated as good. Furthermore, in terms of the sense of touch of the body portion, when creak (creak noise) occurred between the inner surface of the body portion and the outer surface of the storage portion when the body portion was squeezed, it was evaluated as poor, and when no creak occurred between the inner surface of the body portion and the outer surface of the storage portion when the body portion was squeezed, it was evaluated as good. Table 1 shows the results.

TABLE 1

|  | Example 1 | Example 2 | Example 3 | Example 4 | Example 5 | Example 6 | Comparative Example 1 | Com. Ex. 2 | Com. Ex. 3 |
| --- | --- | --- | --- | --- | --- | --- | --- | --- | --- |
| Applying amount (mg) | 0.4 | 0.9 | 1.4 | 10.0 | 20.0 | 31.4 | 38.0 | 52.0 | 100.0 |
| Applying amount (mg/m$^2$) | 10 | 24 | 37 | 300 | 600 | 850 | 1000 | 1400 | 3000 |
| PF handleability | Good | Good | Good | Good | Good | Good | Good | Poor | Poor |
| Blow moldability | Good | Good | Good | Good | Good | Good | Poor | Poor | Poor |
| Sense of touch | Good | Good | Good | Good | Good | Good | Good | Good | — |

As shown in FIG. 1, all of the delamination containers of Examples 1 to 6 in which the applying amount per unit area of the release agent layer 30 was 10 to 850 mg/m$^2$ were evaluated as good in terms of the handleability of the preform assembly, the blow moldability and the sense of touch of the body portion.

On the other hand, all of the delamination containers of Comparative Examples 1 to 3 in which the applying amount per unit area of the release agent layer 30 was greater than 850 mg/m$^2$ were evaluated as poor in terms of the blow moldability. In particular, the delamination container of Comparative Example 2 had void and uneven thickness, and the delamination container of Comparative Example 3 had burst of a container. As the delamination container of Comparative Example 3 had burst of a container, no evaluation was made in terms of the sense of touch of the body portion. Further, the delamination containers of Comparative Examples 2 and 3 were also evaluated as poor in terms of the handleability of the preform assembly.

From the above results, it was confirmed that, when the delamination container was configured to have the release agent layer 30 between the body portion 12 and the storage portion 22 and the applying amount per unit area of the release agent layer 30 was set to 10 to 850 mg/m$^2$, the storage portion 22 could be easily peeled off from the body portion 12 and the blow moldability was enhanced as well. In this manner the delamination container could be precisely molded into a predetermined shape.

It was also confirmed that, when the applying amount per unit area of the release agent layer was set to 10 to 850 mg/m$^2$, creak could be prevented when the body portion was squeezed and the handleability of the preform assembly could be enhanced as well.

It is needless to say that the present disclosure is not limited to the above described embodiment, and can be modified in various manners without departing from the scope of the invention.

For example, in the above described embodiment, although the release agent 70 is applied to the outer surface of the stretch portion 64 of the inner preform 60, it may be applied to the inner surface of the stretch portion 53 of the outer preform 50. The release agent 70 may also be applied to both the outer surface of the stretch portion 64 of the inner preform 60 and the inner surface of the stretch portion 53 of the outer preform 50.

Further, in the above described embodiment, although the preform assembly 40 is provided with a gap between the stretch portion 53 of the outer preform 50 and the stretch portion 64 of the inner preform 60 in the radial direction, the inner surface of the stretch portion 53 of the outer preform 50 may closely adhere to the outer surface of the stretch portion 64 of the inner preform 60 through the release agent 70.

Moreover, in the above described embodiment, although the outer mouth portion 11 is provided with a pair of outside air introduction ports 13, at least one outside air introduction port 13 may be provided.

Furthermore, although the outside air introduction port 13 is provided to the outer mouth portion 11 and is configured as a through hole passing through the outer mouth portion 11, it is not limited thereto, and it may be configured as a gap that is provided between the upper end of the outer mouth portion 11 and the upper end of the inner mouth portion 21 and opens to the outside, for example. Alternatively, the outside air introduction port 13 may be provided to the shoulder portion 12*a*, the main body portion 12*b* or the bottom portion 12*c*.

Moreover, the material of the outer layer body 10 is not limited to polyethylene terephthalate resin, and other synthetic resin materials such as polyester resin, polyolefin resin, nylon resin, polycarbonate resin (PC resin), cycloolefin copolymer resin (COC resin), and cycloolefin polymer resin (COP resin) may be adopted.

Furthermore, the material of the inner layer body 20 is not also limited to polyethylene terephthalate resin, and other synthetic resin materials such as polyester resin, polyolefin resin, nylon resin, polycarbonate resin (PC resin), cycloolefin copolymer resin (COC resin), cycloolefin polymer resin (COP resin), and ethylene-vinyl alcohol copolymer resin (EVOH resin) can also be adopted. When the ethylene-vinyl alcohol copolymer resin is used as a material of the inner layer body 20, the resin having an appropriate ethylene content can be adopted in consideration of barrier properties and flexibility. Further, the inner layer body 20 may have a multilayer structure in which a barrier layer such as an MX nylon resin layer is provided between a pair of polyethylene terephthalate resin layers, for example, so as to secure barrier properties.

Moreover, the outer mouth portion 11 may not be provided with the neck ring 14, and the shapes of the shoulder portion 12*a*, the main body portion 12*b* and the bottom portion 12*c* may be changed in various manners.

Furthermore, in the above described embodiment, although the delamination container 1 is used for a squeeze type dispensing container in which a spout cap provided with an outlet is attached to the outer mouth portion 11, and a content liquid is dispensed by squeezing the body portion 12, it may be used for a container with a pump in which the body portion 12 has a predetermined rigidity that does not allow the body portion 12 to be deformed when squeezed and a pump type dispenser is attached to the outer mouth portion 11.

REFERENCE SIGNS LIST

1 Delamination container
10 Outer layer body
11 Outer mouth portion
11*a* Male thread
12 Body portion
12*a* Shoulder portion
12*b* Main body portion
12*c* Bottom portion
13 Outside air introduction port
14 Neck ring
15 Recessed rib
20 Inner layer body
21 Inner mouth portion
22 Storage portion
23 Gap
24 Enlarged diameter portion
25 Flange portion
26 Longitudinal rib
30 Release agent layer
40 Preform assembly
50 Outer preform
51 Outer mouth portion
51*a* Male thread
52 Outside air introduction port
53 Stretch portion
54 Neck ring
55 Vapor deposited film
60 Inner preform
61 Inner mouth portion
62 Enlarged diameter portion
63 Flange portion
64 Stretch portion
65 Longitudinal rib
70 Release agent
O Axis center
S Storage space

The invention claimed is:

1. A synthetic resin delamination container formed by blow molding a preform assembly comprising an outer preform and an inner preform incorporated inside the outer preform, at least either one of an inner surface of the outer preform and an outer surface of the inner preform being applied with a release agent, the synthetic resin delamination container comprising:
    an outer layer body including a tubular outer mouth portion and a bottomed tubular body portion being continuous with the outer mouth portion;
    an inner layer body including a tubular inner mouth portion disposed inside the outer mouth portion and a volume-reducible and deformable storage portion peelably laminated on an inner surface of the body portion through a release agent layer formed by the release agent; and
    an outside air introduction port configured to introduce outside air between the outer layer body and the inner layer body, wherein:
    an applying amount per unit area of the release agent layer is 10 to 850 mg/m$^2$, and the release agent layer is not applied between the tubular outer mouth portion and the tubular inner mouth portion.

2. The delamination container according to claim 1, wherein the outside air introduction port is a through hole passing through the outer mouth portion in a radial direction.

3. The delamination container according to claim 1, wherein
    the body portion includes a shoulder portion being continuous with a lower end of the outer mouth portion, a tubular main body portion being continuous with a lower end of the shoulder portion and a bottom portion configured to close a lower end of the main body portion; and the release agent layer is provided to an area corresponding to the shoulder portion and the main body portion and is not provided to an area corresponding to the bottom portion.

4. The delamination container according to claim 1, wherein the outer layer body and the inner layer body are each made of polyethylene terephthalate resin.

5. The delamination container according to claim 2, wherein the body portion includes a shoulder portion being continuous with a lower end of the outer mouth portion, a tubular main body portion being continuous with a lower end of the shoulder portion and a bottom portion configured to close a lower end of the main body portion; and the release agent layer is provided to an area corresponding to the shoulder portion and the main body portion and is not provided to an area corresponding to the bottom portion.

6. The delamination container according to claim 2, wherein the outer layer body and the inner layer body are each made of polyethylene terephthalate resin.

7. The delamination container according to claim 3, wherein the outer layer body and the inner layer body are each made of polyethylene terephthalate resin.

8. The delamination container according to claim 5, wherein the outer layer body and the inner layer body are each made of polyethylene terephthalate resin.

* * * * *